May 9, 1933. C. SLUSSER 1,908,564
APPARATUS FOR REMOVING AND CONVEYING PLASTIC MATERIAL FROM MILLS
Filed April 12, 1930
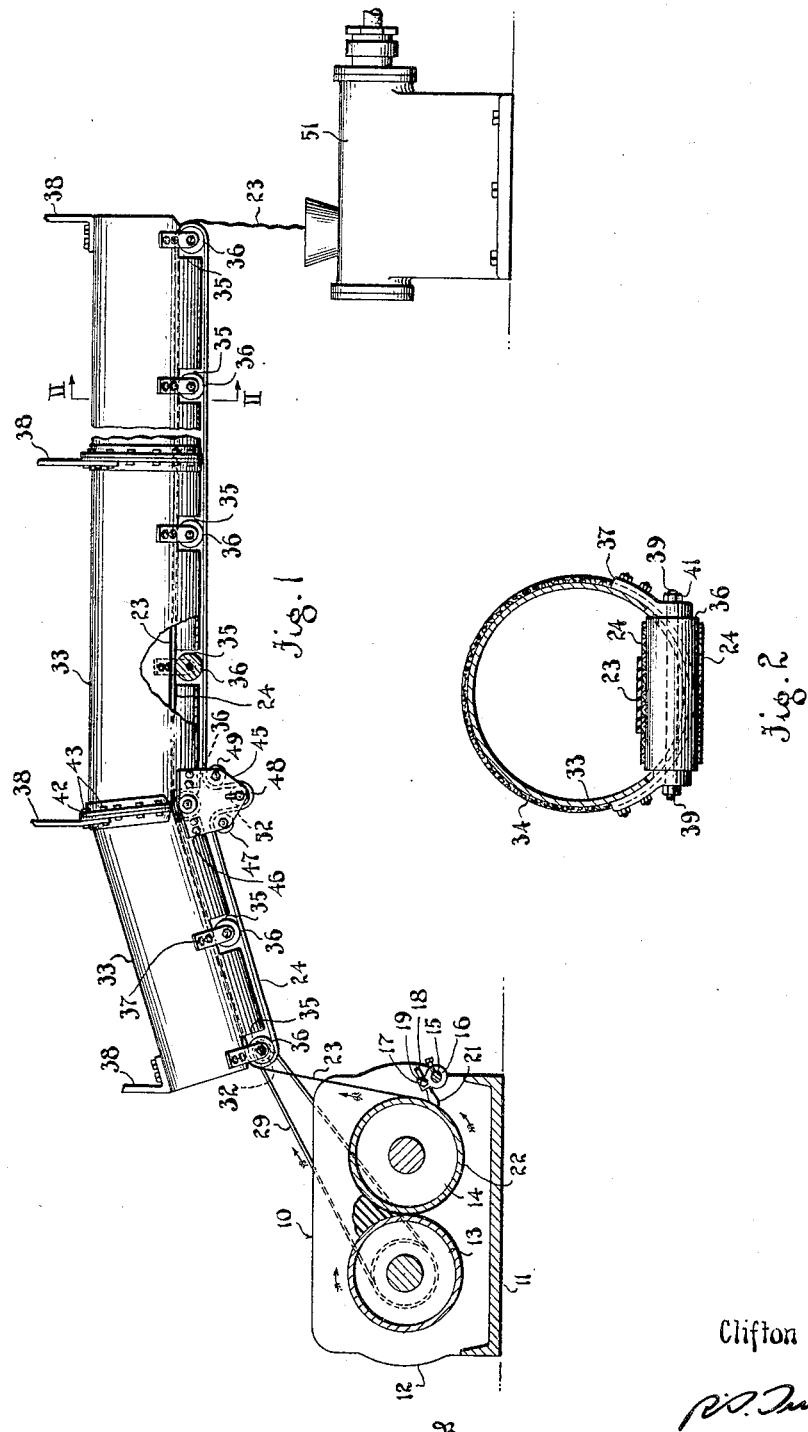
Inventor
Clifton Slusser
By
Attorney Patented May 9, 1933

1,908,564

UNITED STATES PATENT OFFICE

CLIFTON SLUSSER, OF AKRON, OHIO, ASSIGNOR TO THE GOODYEAR TIRE & RUBBER COMPANY, OF AKRON, OHIO, A CORPORATION OF OHIO

APPARATUS FOR REMOVING AND CONVEYING PLASTIC MATERIAL FROM MILLS

Application filed April 12, 1930. Serial No. 443,676.

This invention relates to methods of and apparatus for manipulating plastic material, and it has particular relation to apparatus for removing and conveying plastic material from mixing or warming mills.

An object of the invention is to provide a method of and apparatus for removing and conveying plastic material from a mill more efficiently than has been possible by the methods and apparatus employed heretofore.

Another object of the invention is to provide a method of and apparatus for removing and conveying warm plastic material from a mixing or warming mill mechanically with a minimum loss of heat.

Heretofore a method employed generally in removing plastic material from mills consisted of a plurality of manual operations which are performed successively by a mill attendent. After a batch of material had been mixed or kneaded in a mill for a predetermined length of time, the attendant with the aid of a knife cuts the material from one of the rolls of the mill in large slabs, generally rectangular in shape. After removing the slab of material from the mill roll it was placed upon a stock truck to be transported, when the truck was completely loaded, to a calender or extruding machine. Obviously, a supply of material must be kept at the calendar or extruding machine to permit continuous operation of the machine. Consequently, when warm material is transported by the above described time consuming operations, the heat loss is very great. Frequently, the loss is so great that it becomes necessary to return the material to the mill for rewarming, since cold material cannot be calendared or extruded satisfactorily.

By the employment of the method of and apparatus for removing and conveying plastic material from mills embodying this invention, the material is removed from the roll of a mill in a narrow continuous strip and transported on an enclosed conveyor to a calendar or extruding machine with a minimum loss of heat. By employing this method, the time heretofore required for removing the stock from a mill is greatly shortened, the material is not permitted to cool appreciably, and it is possible to increase the production capacity of any mill room considerably without a proportional increase in personnel or the number of mills operated therein.

For a better understanding of the invention, reference may now be had to the accompanying drawing, forming a part of the specification, in which:

Figure 1 is a side elevational view, partially in cross section, of one form of apparatus for practicing this invention; and Figure 2 is a cross-sectional view of the conveyor taken substantially along the line II—II of Figure 1.

Referring to the apparatus shown in Figure 1, a conventional mill 10, is employed, having a base member 11, and a supporting frame 12 in which mill rolls 13 and 14 are rotatably mounted. The rolls 13 and 14 are rotatably driven in a well-known manner by an arrangement of intermeshing gears, suitable transmission apparatus and a motor (not shown). The mill 10 also is provided with a rod 15 rigidly mounted upon the frame 12 adjacent the roll 14, and is adapted to support a collar 16, that is slidably and circumferentially adjustable, thereon. The collar 16 is provided with an arm 17 having a knife 18 adjustably secured thereto by means of a suitable set screw 19. When the material is ready to be removed from the mill, the blade 21 of the knife 18 is adjusted to project substantially through a sheet of plastic material 22 upon the roll 14 and divides the material to form a substantially continuous strip 23.

A chain 29, which is driven through suitable reduction gearing (not shown) by the roll 13, in turn drives a sprocket wheel 32 keyed to the shaft of a roller 36 supporting one end of an endless conveyor belt 24, operating within a tubular casing 33 sustained by suitable conventional supports 38. The casing 33 may be covered with suitable heat insulation material 34 to reduce the loss of heat during the conveying operation.

The casing 33 consists of a metallic conduit having a plurality of spaced transverse openings 35 along the bottom portion, within each of which is disposed a roller 36. The rollers 36 are secured between suitable brackets 37, which are in turn rigidly attached to the opposite sides of the casing adjacent the openings. The extreme ends of the roller shafts 39 are threaded and the rollers are held in position within the brackets by means of nuts 41 threaded on the ends of the shafts.

The casing 33 may consist of a single unit of conduit, or of a plurality of sections, depending upon the distance the stock is to be transported. In the event a plurality of sections of conduit are required, the several sections may be provided with flanged end portions 42 that are rigidly connected by bolts 43.

Additional rollers 47, 48 and 49 are mounted between brackets 45, and are secured to opposite sides of the casing 33 by bolts 46, at the junction of inclined and horizontal portions of the conveyor. The roller 48 is mounted within a vertical slot 52 in the bracket 45, permitting adjustment toward or away from the horizontal plane of the spaced intermediate rollers 47 and 49 which in turn operates to loosen or tighten, respectively, the belt 24. The intermediate rollers 47 and 49 tend to keep the belt 24 in contact with the lower surfaces of the rollers 36.

The belt 24 is so positioned upon the rollers 36 that the delivery portion thereof operates within the tubular casing 33 and the returning portion of the belt operates over the opposite surface of the rollers 36 and outside of said casing. The leading end of the strip 23 is manually placed upon the belt 24 by the mill attendant and is transported continuously by the belt 24 from the roll 14 to a calendar or extruding machine 51.

Although I have described in detail only a single form which the invention may assume, it will be apparent to those skilled in the art that the invention is not so limited, but that various modifications may be made therein without departing from the spirit of the invention or from the scope of the appended claims.

What I claim is:

1. In combination, means for kneading rubber, means for shaping the kneaded rubber and means for continuously removing and conveying the rubber from the kneading means to the shaping means, and conveying means including a tubular casing having a cover of heat insulating material, said casing having a plurality of spaced transverse openings in the bottom, a roller journaled in each of said openings, an endless belt carried by the rollers, the upper stretch or delivery portion only of the belt being within the casing and means for driving the belt from the kneading means.

2. In combination, means for kneading rubber, means for shaping the kneaded rubber and means for conveying the rubber from the kneading means to the shaping means, said conveying means including a casing, said casing having a plurality of spaced transverse openings in the bottom, a roller journaled in each of said openings, an endless belt carried by the rollers, the upper stretch or delivery portion only of the belt being within the casing, and means for driving the belt from the kneading means.

3. In combination, means for kneading rubber, means for shaping the kneaded rubber end means for conveying the rubber from the kneading means to the shaping means, said conveying means including a casing, said casing having a plurality of spaced openings in the bottom, a roller journaled in each of said openings, an endless belt carried by the rollers, and means for driving the belt.

In witness whereof, I have hereunto signed my name at Akron, in the county of Summit and State of Ohio, U. S. A., this 11th day of April, 1930.

CLIFTON SLUSSER.